United States Patent [19]

Morio et al.

[11] 3,742,242

[45] June 26, 1973

[54] HIGH AND LOW VOLTAGE REGULATING CIRCUIT

[75] Inventors: Minoru Morio, Tokyo; Tadahiko Suzuki, Yokohama; Yutaka Nakagawa, Tokyo, all of Japan

[73] Assignee: Sony Corporation, Tokyo, Japan

[22] Filed: June 8, 1972

[21] Appl. No.: 260,907

[30] Foreign Application Priority Data

June 9, 1971 Japan ................................ 46/48560

[52] U.S. Cl. .......... 307/17, 178/7.5 R, 178/DIG. 11, 307/33, 321/2, 323/22 T, 323/22 SC, 315/27

[51] Int. Cl. .......................... H02m 7/24, G05f 1/64

[58] Field of Search ...................... 323/22 T, 22 SC, 323/57, DIG. 1; 307/17, 31, 32, 33, 34; 321/2, 18; 178/DIG. 11, 7.5 R; 315/169 TV, 27

[56] References Cited

UNITED STATES PATENTS

| | | | |
|---|---|---|---|
| 3,287,623 | 11/1966 | Valancius | 323/22 T |
| 3,295,041 | 12/1966 | Bize | 321/18 X |
| 3,569,818 | 3/1971 | Dahlinger et al. | 307/17 X |
| 3,660,672 | 5/1972 | Berger et al. | 307/17 |
| 3,560,650 | 2/1971 | Hoffman | 178/7.5 R |
| 3,444,426 | 5/1969 | Buechel | 315/27 R |

FOREIGN PATENTS OR APPLICATIONS

| | | | |
|---|---|---|---|
| 156,972 | 1/1953 | Australia | 321/2 |

*Primary Examiner*—Gerald Goldberg
*Attorney*—Lewis H. Eslinger et al.

[57] ABSTRACT

A circuit is provided in which current pulses through a first semi-conductor device and through one winding of a transformer generate high voltage and low voltage pulses in two other windings. Rectifiers are connected to the latter two windings to produce high direct voltage and low direct voltage. A semi-conductor control device is connected to the high voltage rectifier circuit to respond to changes in the high voltage and is connected to the control device to adjust its output impedance as necessary to cause the amplitude of pulses applied to the transformer to increase when the high direct voltage tends to drop, thereby keeping the high voltage constant. However, in order to keep the magnitude of the low direct voltage from changing in response to changes in the pulse amplitude, the control semi-conductor is connected to the low voltage rectifier circuit to provide a compensating direct voltage.

12 Claims, 3 Drawing Figures

HIGH AND LOW VOLTAGE REGULATING CIRCUIT

BACKGROUND OF THE INVENTION

1. Field of the Invention

This invention relates to the field of pulse-type power supplies for generating both high direct voltage and low direct voltage, and in particular it relates to control circuit means for changing the amplitude of the pulses to maintain the high voltage at a desired level but simultaneously providing a compensating direct voltage to keep the low direct voltage from being changed when the amplitude of the pulses is changed.

2. The Prior Art

It has been known heretofore to provide pulse-type power supplies particularly for generating the high voltage necessary for television cathode ray tubes. The direct voltage required for this purpose is frequently of the order of 20kv or more. Pulse-type power supplies have relatively poor inherent regulation, so that when the brightness of the television image increases, the additional current drawn from the high voltage supply has a tendency to cause the high voltage to decrease. Conversely, a reduction in brightness causes the high voltage to increase. In either case, a change in the high voltage changes the size of the television picture and is, therefore, undesirable. Compensating circuits have been provided in the past to obtain a measure of the direct voltage and feed it back to the pulse supply amplifier to increase the amplitude of the pulses of current in the primary of the transformer if the high voltage starts to decrease. Increasing these current pulses causes the output voltage of the transformer to increase and thus returns the high direct voltage to the desired value. Conversely, if the current in the television tube decreases from a nominal value, the high voltage is likely to decrease and information to this effect is transmitted back to the pulse amplifier to decrease the amplitude of current pulses in the primary of the output transformer.

Television circuits may require operating voltages of several different levels, some of which can be generated directly by batteries. Other voltages would require the use of a dropping resistor if they were to be generated directly from a battery source. The use of a dropping resistor means that power is dissipated as heat, and this is most undesirable in the case of portable television receivers because it means that part of the battery power is simply being wasted. Therefore pulse supplies have also been provided to generate not only the high direct voltage but also relatively low direct voltages. Such supplies can use a third winding on the same transformer that supplies the high voltage rectifier.

It is desirable that the magnitude of the relatively low direct voltage remain substantially constant. However, the operation of the aforementioned regulating circuit to keep the high voltage at a predetermined level has the effect of increasing the relatively low direct voltage when the amplitude of current pulses in the primary of the transformer is increased and decreasing the magnitude of the relatively low direct voltage when the amplitude of such current pulses is decreased. Thus the attempt to maintain the high direct voltage at a fixed level results in an undesired change in the value of the relatively low direct voltage.

It is one of the objects of the present invention to provide a voltage regulating circuit to maintain both the high direct voltage and low direct voltage reasonably constant in spite of changes in the load on the high direct voltage rectifier.

Further objects will become apparent from the following specification and drawings.

BRIEF DESCRIPTION OF THE INVENTION

The voltage regulating circuit of the present invention includes a pulse output, or fly-back, transformer, that has a primary winding and two secondary windings. A first semi-conductor device is connected in series with the primary winding and a source of direct current and is actuated by signal pulses such as the horizontal synchronizing pulses or horizontal drive pulses available in a television receiver. This semi-conductor device, which may be a transistor or a gate-controlled switch (GCS), acts like a switch to permit current pulses to flow through the primary of the transformer under the control of signal pulses applied to the input circuit of the semi-conductor device. A second semiconductor device is provided to control the amplitude of the current pulses through the primary winding and through the first semi-conductor device. The second semi-conductor device is, typically, a transistor that has emitter and collector output electrodes with an equivalent output impedance between them. The value of this equivalent output impedance is controlled by a signal fed to the input electrodes, typically the base and emitter. THe output circuit of this latter transistor is connected in series with the primary winding and the first semi-conductor device so that, as the effective output impedance of the control transistor is varied, the amount of current permitted to flow through the primary winding when the first semi-conductor device is conductive may be controlled. The input circuit of the control transistor is connected to the high voltage rectifier circuit to measure the value of the high direct voltage to control the value of the output impedance of the control transistor in such a way as to allow higher current pulses to flow through the primary winding when the high direct voltage decreases and lower current pulses to flow through the primary winding when the high direct voltage increases.

The output circuit of the control transistor is also connected to the low direct voltage rectifier circuit. For example, the connection may include a voltage divider connected directly across the emitter and collector terminals of the control transistors, and an intermediate tap on this voltage divider may be connected to one end of the coil that comprises part of the low direct voltage circuit. The direct voltage component at this tap is added to the direct voltage produced by the coil and rectifier part of the circuit and in the proper polarity to maintain the total direct voltage output of the low direct voltage circuit at a substantially constant value in spite of changes in the amplitude of the current pulses applied to the primary of the transformer.

DETAILED DESCRIPTION OF THE INVENTION

Figure 1:
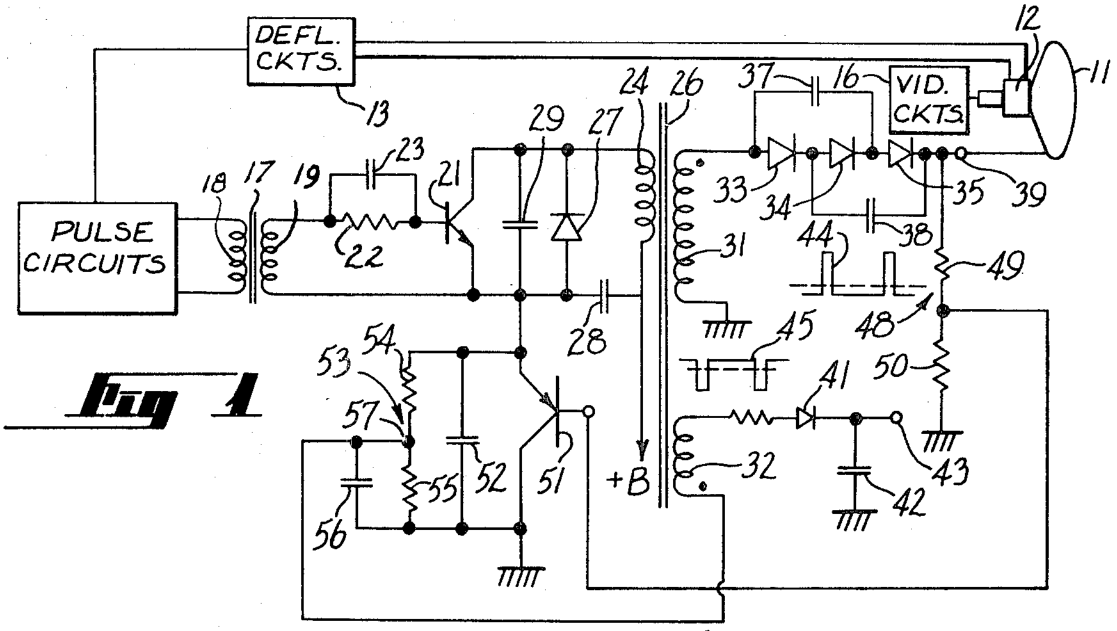
FIG. 1 is a schematic diagram of a voltage regulating circuit according to the present invention.

The circuit in FIG. 1 shows a cathode ray television picture tube 11 having a deflection yoke 12 and deflection circuits 13 actuated by signals from a pulse source 14 which may be a synchronizing signal separator circuit. The cathode ray tube is also actuated by video signals from a video circuit 16. Normally the circuits 14 and 16 include many other parts of a television receiver such as the r.f. circuits, i.f. circuits and, in the case of color television receivers, chrominance and other color circuits.

The regulating circuit of the present invention receives pulses from the pulse source 14 by way of a transformer 17. The transformer has a primary 18 connected to the pulse source 14 and a secondary 19 connected to the emitter of a transistor 21 and, by way of a parallel circuit comprising a resistor 22 and a capacitor 23, to the base of the transistor 21. This capacitor is sometimes referred to as a "speed up" capacitor and the transistor 21 is a switching transistor. The output circuit of the transistor 21, which includes the emitter and collector electrodes of the transistor, is connected in series with a primary winding 24 of a fly-back transformer 26. The other end of the primary winding 24 is connected at a B+ power supply. A damping diode 27 is connected effectively in parallel with the primary winding 24 by way of a filter capacitor 28. A resonance capacitor 29 is connected in parallel with the diode 27 in accordance with well known technology for applying current pulses to a fly-back transformer.

The transformer 26 incorporates two separate windings 31 and 32 so arranged that relatively high voltage pulses are produced across the winding 21 and relatively low voltage pulses are produced across the winding 32 in response to current pulses in the primary winding 24. The high voltage winding 31 is connected to a voltage multiplier rectifier circuit comprising diodes 33–35 and capacitors 37 and 38 to supply a rectified voltage to an output high voltage terminal 39. A capacitor, which may be inherent in the cathode ray tube 11, filters the voltage at this point to produce relatively smooth direct voltage from the high voltage pulses.

Various circuits in the television receiver may require different supply voltages. For certain circuits, the B+ voltage may be of the order of 110v. However, other circuits may require a substantially lower voltage, for example, 18v. The lower voltage could be obtained by applying the 110v. to a voltage divider made up of resistors, but this would require that power be dissipated by the resistors of the voltage divider and such power dissipation is undesirable especially in the case of portable television receivers. Therefore, it is convenient to provide the low direct voltage power supply as part of the pulse-operated power supplies of the receiver. For this purpose the winding 32 is connected to a rectifier 41 and the output of the rectifier is filtered by a filter capacitor 42 to produce a direct voltage of the proper value at an output terminal 43. It should be noted that the connections of the windings 31 and 32 are such that short high voltage impulses indicated by reference 44 are applied to the voltage multiplier circuit in the high voltage rectifier circuit. The average value of this pulse wave is relatively low. On the other hand the winding 32 is oppositely connected so that the rectifier 41 is presented with relatively long pulses 45 of positive polarity. This simplifies the smoothing of the output direct voltage at the terminal 43.

Figure 2:
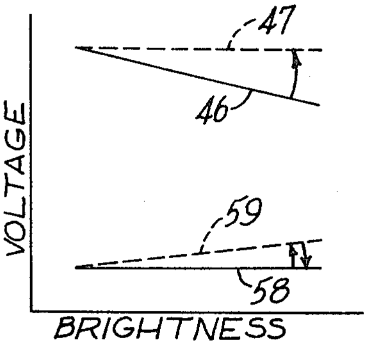
FIG. 2 illustrates the variation of direct high voltage and low voltage with brightness.

The high voltage power supply operated by pulses has relatively low regularity, as indicated in FIG. 2. As the brightness of the television image increases, the anode current increases, and due to the poor regularity, the voltage at the terminal 39 would, in the absence of any correction, tend to decrease. This is shown by the solid line 46. Such decrease would mean that the electrons in the beam in the cathode ray tube would be subjected to less acceleration and hence the deflection provided by the yoke 12 would be greater. This would cause the picture on the face of the cathode ray tube to become larger as it became less bright. Conversely, if the brightness were increased the picture would grow smaller. Any such change in the size of the picture is undesirable.

The correction circuit for maintaining the value of the direct voltage at the terminal 39 substantially constant, as shown by the dotted line 47 in FIG. 2, comprises a voltage divider 48 shown in FIG. 1 and comprising a relatively high impedance resistor 49 and a relatively low impedance resistor 50. The voltage at the tap between these two resistors is a fraction of the voltage at the terminal 39 and is connected back to the base electrode of a control transistor 51. The collector of the control transistor is connected to ground and the emitter of this transistor is connected directly to the emitter of the transistor 21. Therefore the output circuit of the transistor 51, which is the circuit between the emitter and collector of that transistor is connected directly in series with the output circuit of transistor 21 and the primary winding 24 of the transformer 26. A capacitor 52 is connected across the output circuit of the transistor 51 to smooth out voltage changes and leave the direct voltage component. In parallel with the capacitor 52 and the output circuit of the transistor 51 is a voltage divider 53 comprising a resistor 54 and a resistor 55. Another filtering capacitor 56 is connected between the tap 57 of the voltage divider 53 and ground. An output signal may be taken at this point and fed to the automatic brightness limiter (ABL) circuit in the television receiver. The tap 57 is also connected back to one end of the winding 32 so that the direct voltage component at the tap will be connected in series with the direct voltage produced by the rectification and filtering of pulses from the winding 32.

The operation of the circuit is such that any change in the value of the direct voltage across the resistor 50 causes the control transistor 51 to change its effective output impedance. This output impedance is connected in series with the switching transistor 21 and the primary winding 24, and a change in the value of this output impedance will change the amount of current that can flow through the primary winding 24. This current flows in pulses in response to the pulses applied to the input circuit of the transistor 21 and, therefore, a variation in the output impedance of the control transistor 51 simply varies the amplitude of these pulses to make them either greater or less. The effect of the connections in the circuit is such that when the voltage across the resistor 50 decreases due to a decrease in the high voltage at the terminal 39, the amplitude of the pulses through the primary winding 24 is increased. This causes higher voltage pulses to be produced across the winding 31 and returns the direct voltage at the terminal 39 to its original value. An increase in the voltage across the resistor 50 above the normal value of direct voltage at that point would have the opposite effect and would also result in correcting the value of the direct high voltage at the termianl 39.

The change in current in the pulses flowing through the primary winding 24 would necessarily also change the amplitude of the pulses produced at the output winding 32 and this would change the value of the direct voltage at the terminal 43, from the constant value indicated by the solid line 58 in FIG. 2 to the dotted line 59. However, it is not desirable to change the value of the direct voltage at this point in the circuit, and therefore, the present circuit provides means for maintaining this direct voltage constant at the value represented by the solid line 58, even though the value of the current pulses in the winding 24 is changed.

The direct voltage at the terminal 43 is the sum of the voltage rectified from the pulses across the winding 32 and the direct voltage at the tap 57. The voltage at the tap 57 varies with changes in the voltage across the control transistor, which, in turn, varies in response to changes in the fraction of the high voltage measured across the resistor 50. These changes are such that the direct voltage at the tap 57 goes up when the high voltage increases and goes down when the high voltage decreases. The direct voltage at the tap 57 thus varies inversely with the amplitude of the current pulses through the primary winding 24.

In this embodiment the stabilized high voltage may be of the order of 24–25kv and the stabilized low voltage of the order of 18.0 to 18.6v. As a specific, but not limiting, example, stabilization is achieved when the B+ voltage is 110v., the voltage across the emitter and collector terminals of the transistor 51 is 5v. and the resistance values of the resistors 54 and 55 are 27 ohms and 3.3 ohms, respectively.

It should be noted that the control transistor 51 is of the opposite conductivity type from the switching transistor 21. This permits the emitters of the two transistors to be connected together and makes it unnecessary to provide an inverter between the resistor 50 and the base of the transistor 51. Furthermore, although the direct current amplification factor $h_{fe}$ differs from one transistor to the next, it presents no problem in the circuit in which the emitter of the transistor 51 is connected to the emitter of the transistor 21. In this case the voltage difference between the base electrode and the emitter electrode of the transistor 51 is substantially constant at about 0.6v., as it is in all transistors, and it is not necessary to provide manual control of the feedback to the transistor 51.

Figure 3:
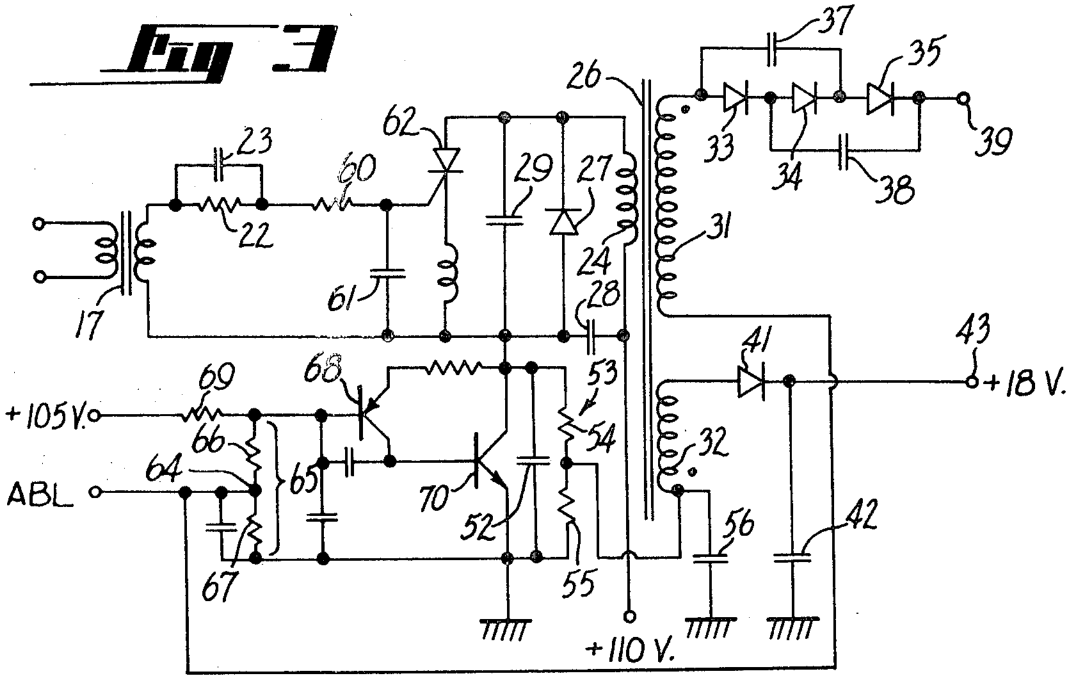
FIG. 3 is a schematic circuit diagram of a modified voltage regulating circuit according to the invention.

FIG. 3 shows a modified form of voltage regulating circuit in which many of the components are the same as in the circuit in FIG. 1. Pulses are applied by way of the transformer 17 and the parallel RC circuit, which comprises the resistor 22 and the capacitor 23, and an integrating circuit comprising another resistor 60 and a capacitor 61 to the input circuit of a gate-controlled switch 62. The input circuit comprises the gate of this semi-conductor device and the cathode. The cathode lead also includes an inductance 63. The anode of the gate-controlled switch 62 is connected in series with the primary winding 24 of the transformer 26 and thus takes th place of the transistor 21 in FIG. 1.

The high voltage rectifier circuit connected to the secondary winding 31 is substantially the same as that in FIG. 1 except that there is no voltage divider across the output. Instead the lower end of the winding 31 is connected to the tap 64 in a voltage divider 65 comprising a resistor 66 and another resistor 67 which are connected in series between the base electrode of a transistor 68 and ground. The base of the transistor 68 is also connected by way of another resistor 69 to a source of positive direct voltage. The transistor 68 is connected as part of a Darlington circuit with another transistor 70. The common load for these transistors is the circuit comprising the gate-controlled switch 62 and the primary winding 24 of the transformer. Across the output emitter and collector terminals of the transistor 70 is the voltage divider 53 shunted by the filter capacitor 52. The tap 57 is connected, as in FIG. 1, to the lower end of the winding 32 of the low direct voltage part of the power supply.

The operation of the circuit in FIG. 3 is generally similar to that in FIG. 1. The gate-controlled switch 62 is capable of carrying a larger current than the transistor 21 of FIG. 1. However, in order to protect the gate-controlled switch 62 against abnormally high currents that may be drawn accidentally through it the inductance 63 is provided. This inductance has little effect on the operation of the circuit under normal conditions.

As in the case of the circuit in FIG. 1, when the current supplied by the high voltage rectifier increases, the output direct voltage at the terminal 39 decreases. The current that flows through the winding 31 also flows through the resistor 67 and creates a voltage drop across it. When this current changes from the normal value, it produces a change in the voltage applied to the base of the transistor 68, which in turn, amplifies that change and applies it as a signal to the transistor 70 in accordance with the usual operation of Darlington circuits. The polarity of the change is such that when the current through the winding 31 increases, which results in a decrease in the high direct voltage at the terminal 39, the output impedance of the transistor 70 decreases and causes the amplitude of current pulses through the primary winding 24 to increase, thus increasing the amplitude of the voltage pulses across the winding 31 and returning the high voltage at the terminal 39 to the desired level. This compensating effect is the same as in the circuit in FIG. 1.

The compensating effect of the low direct voltage at the output terminal 43 is also the same as in FIG. 1. When the output impedance of the transistor 70 is reduced to cause the amplitude of the current pulses through the primary winding 24 to increase, the voltage across the voltage divider 53 decreases and thus the voltage at the tap 57 decreases. This adds a smaller direct voltage to the voltage produced by the pulses across the winding 32 and tends to make the direct voltage at the terminal 43 remain constant. Conversely, when the current through the high voltage winding 31 decreases, the voltage applied to the base of the transistor 68 increases, thereby decreasing the collector current of the transistor 68 and the collector current of the transistor 70. This causes the output impedance of the transistor 70 to become greater and thus the voltage across the voltage divider 53 increases. This, in turn, causes the voltage at the tap 57 to increase and adds a greater direct voltage in series with the voltage produced from the pulses across the winding 32. This maintains the direct voltage at the terminal 43 at a constant level, no matter whether the current through the high voltage winding increases or decreases.

What is claimed is:

1. A voltage regulating circuit comprising:

A. an output transformer comprising first, second and third windings;

B. a first semi-conductor device comprising:

1. an input circuit to be energized by signal pulses, and 2. an output circuit connected to said first winding to draw pulses of current therethrough in response to said signal pulses;

C. a first rectifier circuit connected to said second winding to produce a relatively high direct voltage;

D. a second rectifier circuit connected to said third winding to produce a relatively low direct voltage;

E. a second semi-conductor device having an input electrode and a variable impedance output circuit connected to said output circuit of said first semi-conductor device;

F. a connection from said first rectifier circuit to said input electrode of said second semi-conductor device to cause the impedance of said second semi-conductor to decrease so as to cause said first semi-conductor device to draw current pulses of increased amplitude through said first winding when the relatively high direct voltage of said first rectifier circuit decreases; and G. a connection from said second semi-conductor device to said second rectifier circuit to provide a compensating direct voltage offset when the output impedance of said second semi-conductor device decreases.

2. The voltage regulating circuit of claim 1 in which said output circuit of said first semi-conductor device is connected in series with said output circuit of said second semi-conductor device.

3. The voltage regulating circuit of claim 2 in which said output circuit of said first semi-conductor device is connected directly in series between said first winding and said output circuit of said second semi-conductor device.

4. The voltage regulating circuit of claim 3 in which said connection from said second semi-conductor device to said second rectifier circuit comprises a voltage divider connected in parallel with said output circuit of said second semi-conductor device.

5. The voltage regulating circuit of claim 4 in which one end of said third winding is connected to an intermediate point on said voltage divider.

6. The voltage regulating circuit of claim 1 in which said first semi-conductor device is a transistor.

7. The voltage regulating circuit of claim 6 in which said second semi-conductor device is a transistor of the opposite conductivity type from said first-named transistor, and the emitters of said transistors are connected directly together.

8. The voltage regulating circuit of claim 1 in which said first semi-conductor device is a gate-controlled switch.

9. The voltage regulating circuit of claim 8 in which said output circuit of said first semi-conductor device comprises the anode and cathode of said gate-controlled switch, and said regulating circuit comprises, in addition, an inductance 10. The voltage regulating circuit of claim 8 in which said second semi-conductor device comprises a Darlington circuit connection of first and second transistors.

11. The voltage regulating circuit of claim 1 in which said connection from said first rectifier circuit comprises a voltage divider across said first rectifier circuit and comprising an intermediate tap connected to an input electrode of said second semi-conductor device.

12. THe voltage regulating circuit of claim 1 in which said second semi-conductor device comprises an input circuit and said connection from said first rectifier circuit comprises a voltage divider connected across said input circuit of said second semi-conductor device and having an intermediate tap connected to one end of said second winding.

* * * * *